(12) United States Patent
Munoz

(10) Patent No.: US 10,330,515 B2
(45) Date of Patent: Jun. 25, 2019

(54) DEVICE FOR CONTACTLESS MEASUREMENT OF A LEVEL IN A TANK

(71) Applicant: AKWEL SA, Champfromier (FR)

(72) Inventor: Regis Munoz, Saint Rambert d'Albon (FR)

(73) Assignee: AKWEL SA, Champfromier (FR)

(*) Notice: Subject to any disclaimer, the term of this patent is extended or adjusted under 35 U.S.C. 154(b) by 112 days.

(21) Appl. No.: 15/248,302

(22) Filed: Aug. 26, 2016

(65) Prior Publication Data

US 2017/0059386 A1 Mar. 2, 2017

(30) Foreign Application Priority Data

Aug. 26, 2015 (FR) ...................... 15 57947

(51) Int. Cl.
*G01F 23/26* (2006.01)
*G01F 25/00* (2006.01)

(52) U.S. Cl.
CPC .......... *G01F 23/263* (2013.01); *G01F 23/266* (2013.01); *G01F 23/268* (2013.01); *G01F 25/0076* (2013.01); *F01N 2610/02* (2013.01); *F01N 2610/142* (2013.01); *F01N 2900/1814* (2013.01)

(58) Field of Classification Search
CPC .................................................. G01F 25/0076
See application file for complete search history.

(56) References Cited

U.S. PATENT DOCUMENTS

| 5,765,434 A | 6/1998 | Harbaugh | |
| 6,337,959 B1* | 1/2002 | Kwak | G01F 23/265 |
| | | | 399/237 |
| 6,443,006 B1* | 9/2002 | Degrave | G01F 23/266 |
| | | | 340/620 |
| 8,893,477 B2* | 11/2014 | Konno | F01N 13/009 |
| | | | 60/277 |
| 2008/0053216 A1 | 3/2008 | Li et al. | |
| 2009/0229683 A1* | 9/2009 | Baek | G01F 23/263 |
| | | | 137/386 |

FOREIGN PATENT DOCUMENTS

CN 101561307 A 10/2009

* cited by examiner

*Primary Examiner* — Justin N Olamit
(74) *Attorney, Agent, or Firm* — Oliff PLC

(57) ABSTRACT

A measuring device that measures the level of fluid in a tank, for example a level of an aqueous urea solution in a tank for catalytic converters of combustion engines. The measuring means include: at least one sensor including a capacitive element electrically coupled to an oscillator configured to deliver a signal $S_i$ whose frequency $F_{iPAD}$ is a function of the capacitance of the capacitive element; at least one sensor being intended to be disposed outside of the tank, so that the capacitance of the capacitive element varies based on the level n of the fluid, when the level is comprised between a first threshold $h_{i\text{-}min}$ and a second threshold $h_{i\text{-}max}$; a processing module, coupled to at least one sensor, and configured to determine the level n of fluid in the tank based on the frequency of the signal $S_i$.

15 Claims, 9 Drawing Sheets

DEVICE FOR CONTACTLESS MEASUREMENT OF A LEVEL IN A TANK

The present invention relates to the field of systems for storing and pressurizing/supplying a fluid. In particular, such systems are used for various purposes in personal motor vehicles, heavy trucks, agricultural machines, or still in construction equipments and machines.

In particular, the invention concerns means for measuring a level of fluid in such systems, for example a level of an aqueous urea solution (a trade name of which is «AdBlue®»), in a storage system for catalytic converters of combustion engines.

Prior Art

The catalysts using the principle of selective catalytic reduction in order to reduce the emissions of nitrogen oxides (NOx), generally comprise a storage system adapted to contain a fluid mainly composed of urea and water (a trade name of which is «AdBlue®»). When the catalyst is in active operation, the fluid is brought into contact with the gases resulting from the combustion of fuel in the engine of the vehicle, so as to enable the transformation of the nitrogen oxides into nitrogen and water.

It is desirable to have reliable means for measuring a level of a fluid in the storage system, for example in order to provide the information necessary to a gauge capable of indicating the current fluid level in the pressurized storage system and generating an alert when this level turns out to be insufficient to guarantee the proper operation of the catalyst.

Various solutions are nowadays implemented in an attempt to provide measuring solutions. Thus, it is known to use mechanical devices, for example floats, introduced in the enclosure of the storage system containing the fluid. The reliability of the information produced by these mechanical measurement devices is limited by the sensitivity to dispersions of the fluid. Furthermore, in the case where the fluid has frozen—the aqueous urea solutions freeze at about −11° C.—, the mechanical devices are inoperative, because of the immobility imposed on the floats. Finally, the mechanical devices are generally bulky.

It is also known to use measuring devices including an ultrasonic source such as a ceramic capsule or a piezoelectric component. Nonetheless, besides the impossibility of obtaining a measurement of the fluid level in the case where the latter has frozen, the cost of this solution turns out to be high.

Another solution consists in using a level measuring device based on the measurement of the variations of the electrical capacitance. There are devices in contact with the fluid including a measuring circuit—typically an integrated circuit—, provided with a capacitive sensor, inserted in a protective sheath which is in turn plunged in the storage system. In order to ensure the capacitive coupling between the sensor and the liquid, throughout the sheath, a capacitive transmission element, for example a gel, is required. Hence, this solution turns out to be difficult to produce because, besides the complexity of the assembly, it is necessary that the walls of the sheath have a small thickness in order to enable the measurement of the capacitance, and made of a materiel adapted both to the immersion in an aqueous urea solution and to the measurement of the capacitance throughout said walls. Finally, these devices require arranging a sealing for separating the wet area from the dry area, at the interface between the tank and the measuring device.

Hence, there is still a need for alternative means for measuring a level of fluid, in a fluid storage system, which do not require the use of additional elements in contact with said fluid, while remaining reliable and inexpensive to produce and to implement.

SUMMARY OF THE INVENTION

One of the objects of the invention is to provide effective means for determining a level of fluid, in a fluid storage system, which do not require the use of additional elements in contact with said fluid, while remaining reliable and inexpensive to produce and to implement. Another object of the invention is to enable the determination of a level of fluid comprised in a container the walls of which are made from thermoplastics—for example, high-density polyethylene, polyethylene, polypropylene or polyoxymethylene—have a thickness substantially smaller than or equal to 5 mm, and throughout an air gap the thickness of which may reach substantially 3 mm. Another object of the invention is to enable the determination of a level of fluid comprised in a container, nonetheless without requiring the use of a conductivity gel between the wall of the container and the measuring means. Another object of the invention is to provide means which do not require the use of elements the manufacture and the assembly of which turn out to be complex, such as for example the sheaths used in the devices of the prior art for containing sensors. Another object of the invention is to provide means for measuring a level of fluid in a container adapted to be disposed out of said container, without any contact with the fluid, and without any contact with the container.

One or several of these objects is/are achieved by the level measuring device, the kits and the level measuring method according to the independent claims. The dependent claims further provide solutions to these objects and/or other advantages.

More particularly, according to a first aspect, the invention relates to a measuring device intended to cooperate with a tank capable of containing a fluid. The device is adapted to determine a level n of the fluid, along a vertical axis NM of said tank. The device includes:

at least one sensor including a capacitive element electrically coupled to an oscillator configured to deliver a signal $S_i$ whose frequency $F_{iPAD}$ is a function of the capacitance of the capacitive element; said at least one sensor being intended to be disposed outside of the tank, so that the capacitance of the capacitive element varies based on the level n of the fluid, when said level is comprised between a first threshold $h_{i\text{-}min}$ and a second threshold $h_{i\text{-}max}$;

a processing module, coupled to said at least one sensor, and configured to determine the level n of fluid in the tank based on the frequency of the signal $S_i$.

The processing module may be configured to determine the level n of fluid in the tank based on the frequency of the signal $S_i$ and on a reference frequency $F_{iVCO}$ proper to said at least one sensor.

The processing module may be configured to determine the reference frequency $F_{iVCO}$, in an initial calibration phase, and/or periodically—for example every week—, and/or upon the occurrence of an event, for example after identifying potential errors of measurement, and/or upon receipt of a command, for example from a user via a user interface or from another system. Furthermore, such an operation allows calibrating the measuring device, throughout its entire service life, in order to compensate the potential drift of the electronic components and the ageing/deformations of the tank. The reference frequency $F_{iVCO}$ may be equal to the frequency of the signal $S_i$ delivered by the oscillator of said at least one sensor when the level of the fluid is lower than the threshold $h_{i-min}$.

In one embodiment, the processing module is coupled to an external module:
- by a communication module, capable of enabling a transmission of the level n of fluid in the tank to the external module; and/or
- by a power-supply module, capable of enabling a transmission of energy from the external module to said at least one sensor.

Typically the external module may be a motherboard.

In one embodiment, the processing module includes a diagnosis module configured:
- when the fluid level n determined by the processing module is lower than the first threshold $h_{i-min}$, to identify a dysfunction if the difference between the frequency $F_{iPAD}$ of the signal $S_i$ and a first reference frequency is substantially non-zero;
- when the fluid level n determined by the processing module is higher than the second threshold $h_{i-max}$, to identify a dysfunction if the difference between the frequency $F_{iPAD}$ of the signal $S_i$ and a second reference frequency is substantially non-zero.

The first reference frequency may be equal to the frequency of the signal $S_i$ delivered by the oscillator of said at least one sensor when the level of the fluid is lower than the threshold $h_{i-min}$, for example when the tank is empty. The first reference frequency may be determined during a calibration phase by measuring the frequency of the signal $S_i$ or it may be predetermined. The second reference frequency may be equal to the frequency of the signal $S_i$ delivered by the oscillator of said at least one sensor when the level of the fluid is higher than the second threshold $h_{i-max}$, for example when the tank is full of fluid. The second reference frequency may be determined during a calibration phase by measuring the frequency of the signal $S_i$ or it may be predetermined.

In one embodiment, the processing module includes:
- a voltage-controlled reference oscillator configured to produce a signal whose frequency $F_{iVCO}$ varies based on a control signal;
- a microprocessor configured to generate and deliver to the reference oscillator the control signal so that the frequency $F_{iVCO}$ of the signal produced by the reference oscillator substantially corresponds to the reference frequency proper to said at least one sensor;
- a phase-locked loop configured to generate an output signal $\Delta i$ based on the difference between the frequency $F_{iPAD}$ of the signal $S_i$ delivered by said at least one sensor and the reference frequency $F_{iVCO}$;
- an output filter, coupled to the output of the phase-locked loop, adapted to convert the phase-shift signal $\Delta i$ into an output voltage $U_i$;
- a conversion module configured to determine the level n based on the output voltage $U_i$.

The processing module may include a diagnosis module configured:
- when the fluid level n determined by the conversion module is lower than the first threshold $h_{i-min}$, to identify a dysfunction if the difference between the output voltage $U_i$ and a first reference voltage $U_{DEC}$ is substantially non-zero;
- when the fluid level n determined by the conversion module is higher than the second threshold $h_{i-max}$, to identify a dysfunction if the difference between the output voltage $U_i$ and a second reference voltage $U_{REC}$ is substantially non-zero.

The first reference voltage $U_{DEC}$ may be equal to the voltage $U_i$ measured for the $i^{th}$ sensor when the fluid level n determined by the conversion module is lower than the first threshold $h_{i-min}$, for example when the tank is empty. The first reference voltage $U_{DEC}$ may be determined during a calibration phase by measuring the voltage $U_i$ for the $i^{th}$ sensor or it may be predetermined. The second reference voltage $U_{REC}$ may be equal to the voltage $U_i$ measured for the $i^{th}$ sensor when the fluid level n determined by the conversion module is higher than the second threshold $h_{i-max}$, for example when the tank is full. The second reference voltage $U_{REC}$ may be determined during a calibration phase by measuring the voltage $U_i$ for the $i^{th}$ sensor or it may be predetermined.

The measuring device may further include at least one second sensor including a second capacitive element electrically coupled to a second oscillator configured to deliver a second signal whose frequency is a function of the capacitance of the second capacitive element. Said at least one second sensor is intended to be disposed outside of the tank, so that the capacitance of the second capacitive element varies based on the level n of the fluid, when said level is comprised between a third threshold $h_{i-min}$ and a fourth threshold $h_{i-max}$. The processing module is coupled to said at least one second sensor, and is configured to determine the level n of fluid in the tank based on the frequency of the signal $S_i$ of said at least one first sensor and on the frequency of the signal $S_i$ of said at least one second sensor. In one embodiment, the range of values defined by the third threshold and the fourth threshold is disjoint from the range of values defined by the first threshold and the second threshold. Thus, it is possible to cover the case where it is necessary to know the level n only when the latter is close to some values, for example only when the level n is comprised between 0 and 5 cm and between 15 and 20 cm.

The third threshold may be lower than the second threshold. When the third threshold is lower than the second threshold, the processing module may include a diagnosis module configured, when the fluid level n determined by the conversion module is comprised between the third threshold and the second threshold, to identify a dysfunction if the absolute value of the difference between, on the one hand, the fluid level n determined by the processing module from the signal $S_i$ of said at least one second sensor and, on the other hand, the fluid level n determined by the processing module from the signal $S_i$ of said at least one sensor is higher than a permissible deviation. For example, the permissible deviation may be chosen and/or configured based on the measurement accuracy, whether theoretical or measured during a calibration step, for each sensor.

According to a second aspect, the invention relates to a kit including a measuring device according to the first aspect and a tank intended to be assembled so that a space is arranged between the surface of the capacitive element of said at least one sensor and the wall of the tank. The kit may also include an aqueous urea solution intended to be contained in the tank. The tank may also be intended to contain other types of fluids, for example a fuel, a combustible, a coolant, a cleaning liquid, a lubricant, a heat-transfer liquid, etc.

According to a third aspect, the invention relates to a kit including a measuring device according to the first aspect, and an external module, for example a motherboard, configured to receive the level n of the fluid in the tank and/or to enable a transmission of energy to said at least one sensor.

According to a fourth aspect, the invention relates to a method for measuring a level n of fluid contained in a tank, along a vertical axis NM of said tank. The method is adapted in particular to be implemented by the device according to the first aspect. The method includes the following steps of:

collecting at least one signal $S_i$ delivered by a sensor, the sensor including a capacitive element electrically coupled to an oscillator configured to deliver a signal $S_i$ whose frequency $F_{iPAD}$ is a function of the capacitance of the capacitive element; said at least one sensor being intended to be disposed outside of the tank, so that the capacitance of the capacitive element varies based on the level n of the fluid, when said level is comprised between a first threshold $h_{i-min}$ and a second threshold $h_{i-max}$;

calculating the difference between the frequency of the signal $S_i$ and a reference frequency $F_{iVCO}$;

determining the level n of fluid in the tank based on the frequency of the signal $S_i$.

The method may also include the following steps of:

when the determined fluid level n is lower than the first threshold $h_{i-min}$, identifying a dysfunction if the difference between the frequency $F_{iPAD}$ of the signal $S_i$ and a first reference frequency is substantially non-zero;

when the determined fluid level n is higher than the second threshold $h_{i-max}$, identifying a dysfunction if the difference between the frequency $F_{iPAD}$ of the signal $S_i$ and a second reference frequency is substantially non-zero.

In one embodiment, at least one second signal $S_i$ delivered by a second sensor is collected. The second sensor includes a capacitive element electrically coupled to an oscillator configured to deliver a second signal $S_i$ whose frequency $F_{iPAD}$ is a function of the capacitance of the capacitive element. Said at least one second sensor is intended to be disposed outside of the tank, so that the capacitance of the capacitive element varies based on the level n of the fluid, when said level is comprised between a third threshold $h_{i-min}$ and a fourth threshold $h_{i-max}$. The third threshold is lower than the second threshold. The level n of fluid in the tank is determined based on the frequency of the signal $S_i$ of said at least one sensor and on the frequency of the signal $S_i$ of said at least one second sensor. When the fluid level n determined during the fluid level n determination step is comprised between the third threshold and the second threshold, the method further includes the following step of:

identifying a dysfunction if the absolute value of the difference between, on the one hand, the fluid level n determined from the signal S, of said at least one second sensor and, on the other hand, the fluid level n determined from the signal S, of said at least one sensor, is higher than a permissible deviation.

BRIEF DESCRIPTION OF THE FIGURES

Other particularities and advantages of the present invention will appear, in the description of embodiments hereinafter, with reference to the appended drawings, in which.

DETAILED DESCRIPTION

Figure 1:
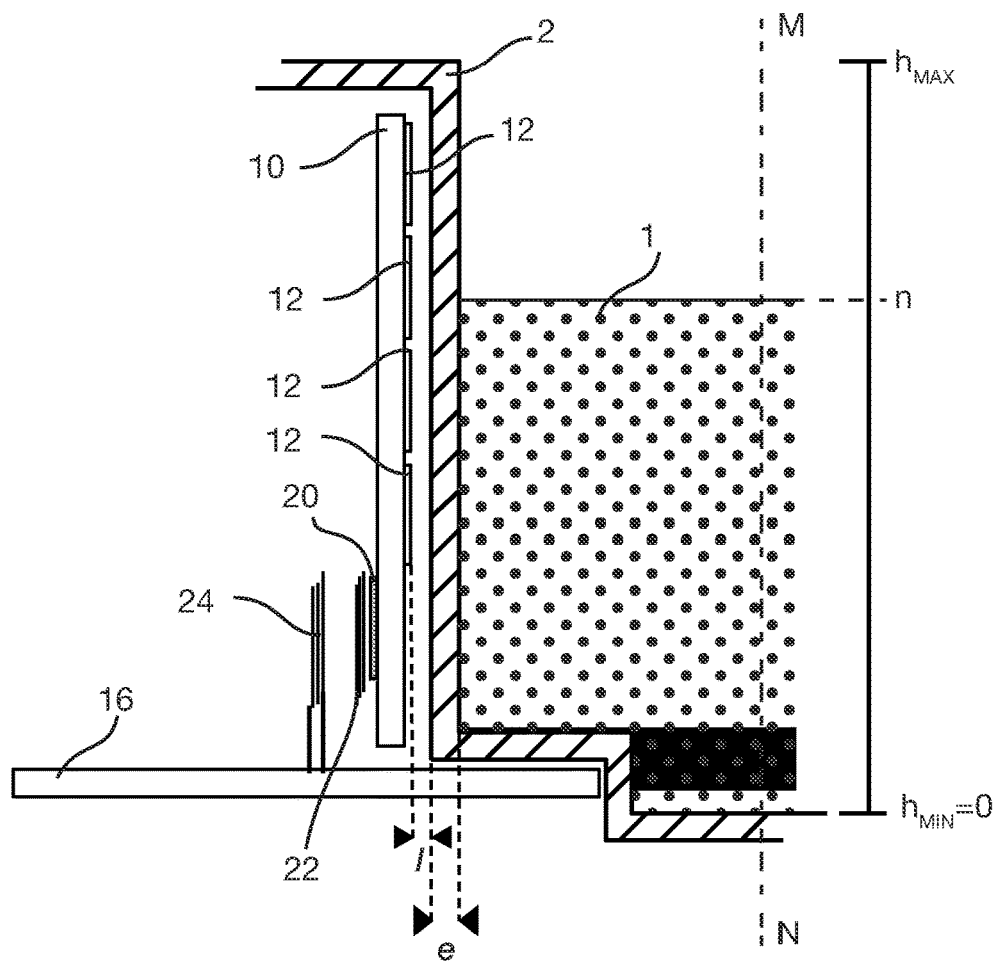
FIG. 1 is a cross-section of a device for measuring a level of fluid in a storage system, according to one embodiment of the invention.
Figure 2:
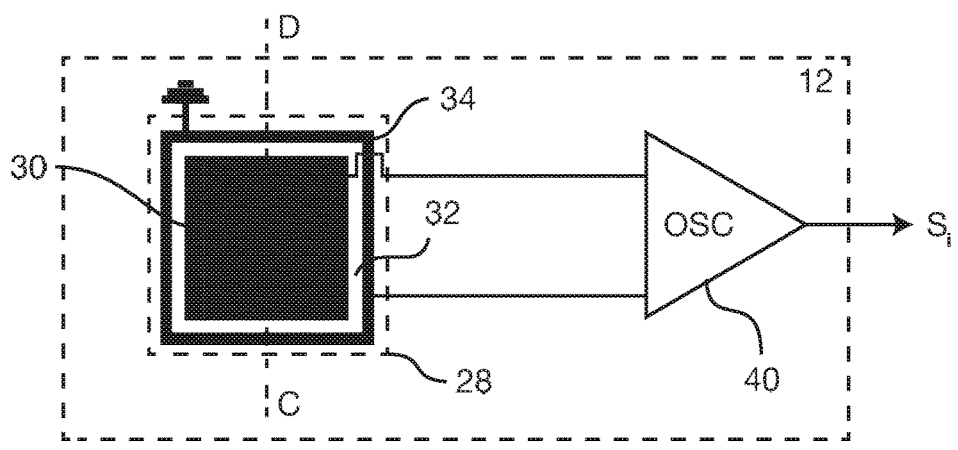
FIG. 2 is a block diagram of one of the sensors used in the measuring device.
Figure 3:
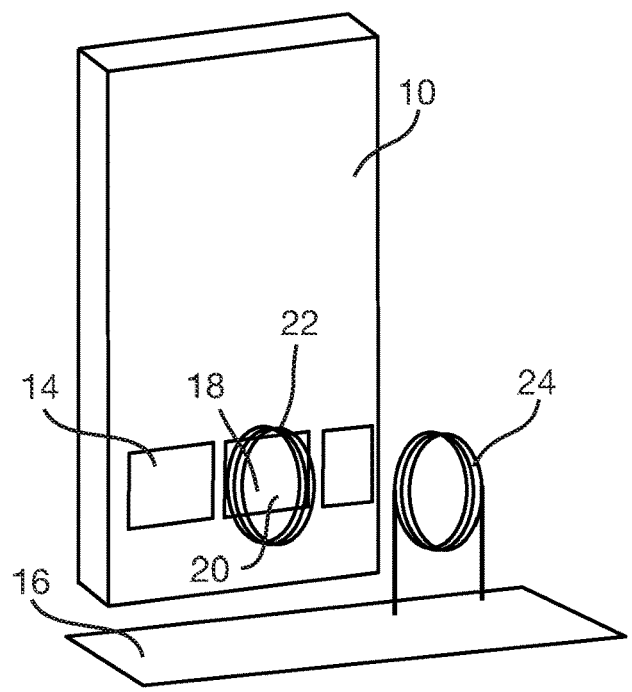
FIG. 3 is a three-dimensional schematic view of a measuring device, according to one embodiment of the invention.

Referring to FIGS. 1, 2 and 3, a device for measuring a level n of fluid along an axis NM of a tank, according to one embodiment of the invention, will be now described. The measuring device is adapted to measure the level n of a fluid 1 along the axis NM of a tank 2, without any contact with said fluid 1. Typically, the axis NM is the vertical axis of the tank 2, and the level n then corresponds to the height of the fluid 1 in the tank 2. A possible, but not exclusive, use of the measuring device is the determination of a level of an aqueous urea solution (a trade name of which is «AdBlue®»), in a storage system for catalytic converters of combustion engines. Nonetheless, the measuring device according to the invention is also suitable for measuring the level of other types of fluids contained in various types of fluid storage systems, such as, for example, windshield washer fluid, fuel, oil, water, glycol.

Figure 6A:
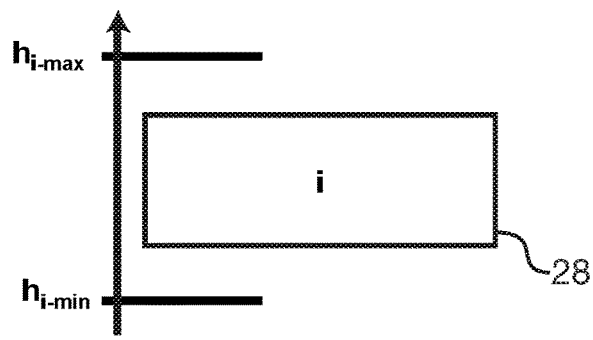
FIG. 6a is a diagram illustrating the level measuring range proper to each sensor of the measuring device.
Figure 6B:
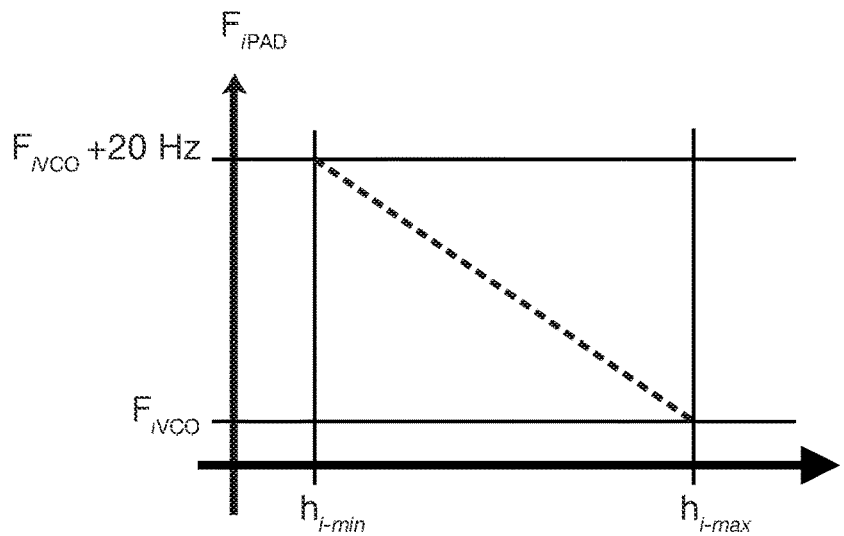
FIG. 6b is a diagram representing a theoretical curve describing the frequency observed by a sensor as a function of the level of fluid in the storage system.
Figure 6C:
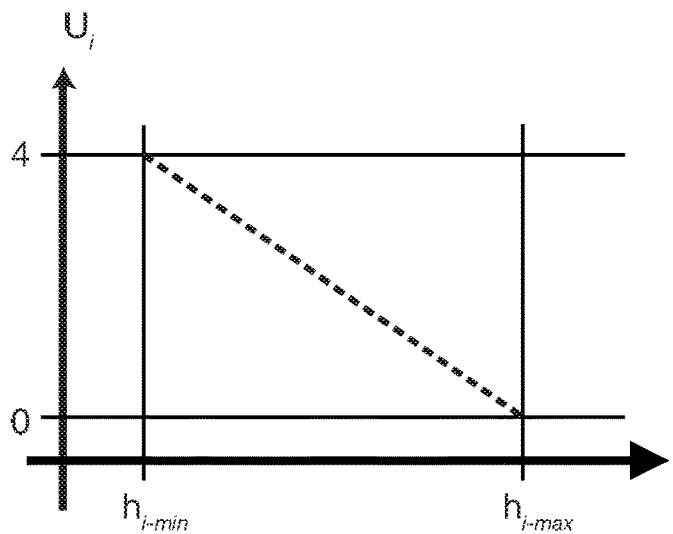
FIG. 6c is a diagram representing a theoretical curve describing the voltage, delivered by the electrical measuring circuit when the latter takes into account the frequency observed by one of the sensors, as a function of the level of fluid in the storage system.

The measuring device includes a detection circuit 10—typically an electronic board—on which a number $n_c$ of sensors 12 is arranged. The number $n_c$ is chosen based on the variations of the level n which are likely to be measured as well as on the desired accuracy. In the example illustrated in FIG. 1, the detection circuit 10 includes a number $n_c=4$ of sensors 12. Nonetheless, the number $n_c$ may also be equal to 1, one single sensor 12 being enough to determine the level n if the variations of the level n which are likely to be measured are limited and/or if the level n has to be measured only for a predetermined range of values. In the following description, the number i refers to the $i^{th}$ sensor of the electronic board, i being comprised between 1 and $n_c$. Thus, the $i^{th}$ sensor 12 outputs an electrical signal $S_i$. As illustrated in FIG. 6a, each sensor 12 is designed and disposed so as to enable a measurement of the level n when the latter is comprised in a predetermined range of values. Thus, the $i^{th}$ sensor 12 allows measuring the level n when the latter is comprised in a determined range $P_i$ [$h_{i-min}$ ... $h_{i-max}$]. For example, if the level n may vary between 0 and 20 cm in the tank 2, the number $n_c$ of sensors 12 may be chosen equal to 11, each sensor being adapted to measure the level n over a 24 mm wide range. The range $P_2$ of the second sensor may be equal to [18 mm ... 42 mm]. Thus, the second sensor 12 will enable a measurement of the level n when the latter is comprised between 1.8 and 4.2 cm.

Figure 7:
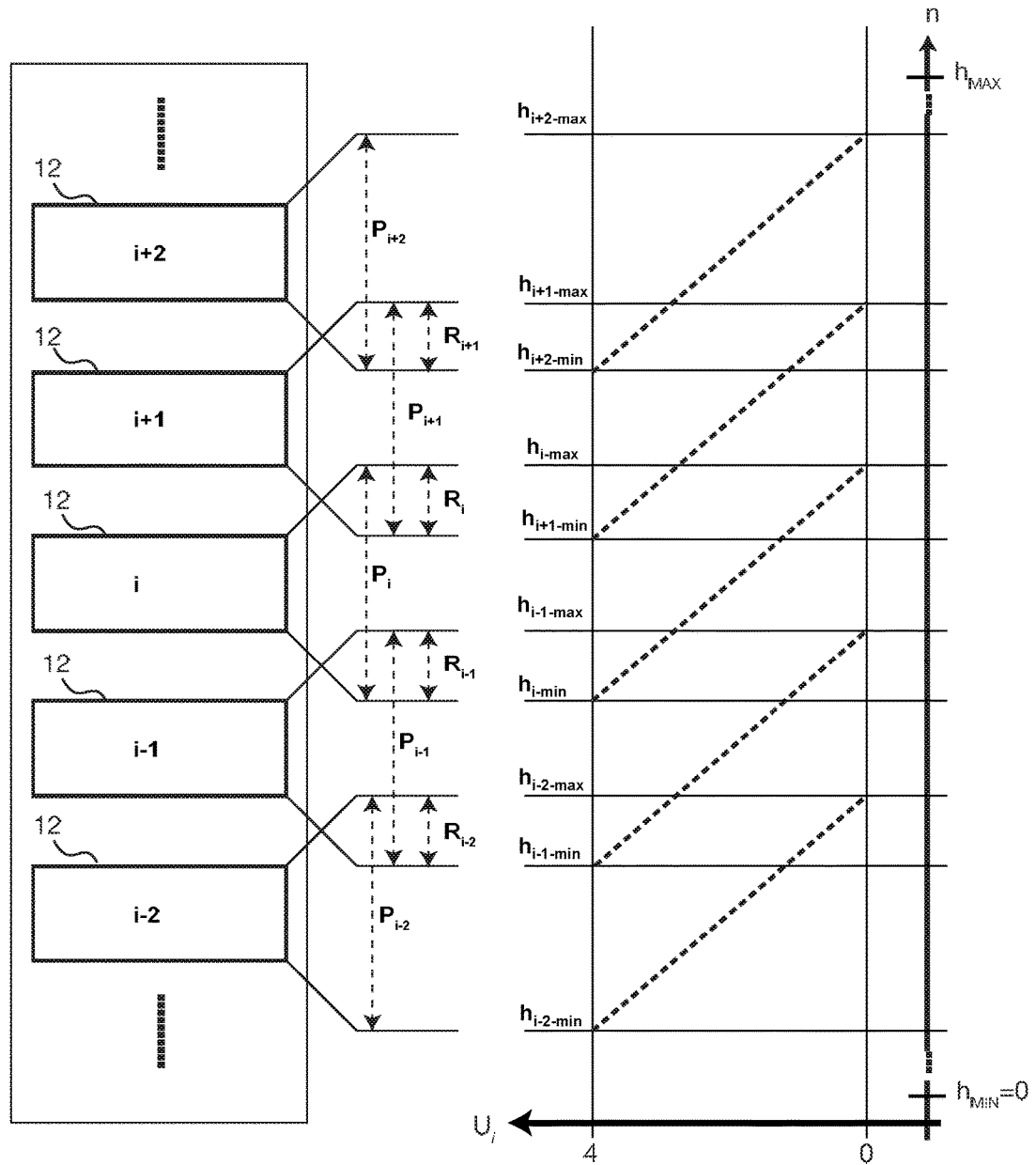
FIG. 7 is a diagram representing theoretical curves describing the voltage, delivered by the electrical measuring circuit when the latter takes into account the frequency observed for each sensor, as a function of the level of fluid in the storage system.

In one embodiment, illustrated in FIG. 7, the predetermined range of values $P_i$ of each sensor 12 partially overlaps the predetermined ranges of values $P_{i-1}$; $P_{i+1}$ of the adjacent sensors 12. Thus, by considering as example the $i^{th}$ and the $i+1^{th}$ sensors 12 to which are associated respectively the range $P_i$ [$h_{i-min}$ ... $h_{i-max}$] and the range $P_{i+1}$ [$h_{i+1-min}$ ... $h_{i+1-max}$], the overlapping range $R_i$ then corresponds to [$h_{i+1-min}$ ... $h_{i-max}$] with $h_{i+1-min}<h_{i-max}$. For example, if the level n can vary between 0 and 20 cm in the tank 2, and the number $n_c$ of sensors 12 is chosen equal to 11, while considering a range $P_2$ equal to [18 mm ... 42 mm] and a range $P_3$ equal to [36 mm ... 60 mm], the overlapping range $R_2$ will therefore be equal to [36 mm ... 42 mm].

The ranges do not necessarily cover all the possible level values, but may cover only a critical area. For example, it may be provided to measure the value of the level only if the latter is higher than or equal to 10 cm.

Alternatively, each sensor 12 may be disposed so that the ranges $P_i$ are substantially adjacent.

Alternatively, each sensor 12 may also be disposed so that the ranges $P_i$ are disjoint, in particular if it is not necessary to measure the value of the level n for some ranges of values. For example, this case may be encountered when it is necessary to know the level n only when the latter is close to some values, for example, only when the level n is comprised between 0 and 5 cm and between 15 and 20 cm.

The detection circuit 10 further includes a processing module 14, coupled to the sensors 12, and configured to collect the signals $S_i$. The detection circuit 10, and in particular the processing module 14 thereof, are adapted to be coupled to a motherboard 16 via a communication module 18. The motherboard 16 is external to the measuring device, and may be for example shared with other external devices. In particular, the communication module 18 is configured to establish a data link between the motherboard 16 and the processing module 14 of the detection circuit 10. It is then possible to transmit the value of the level n and/or the $n_c$ levels $n_i$ as measured by each sensor 12 and determined by the processing module 14 to the motherboard 16.

The detection circuit 10 also includes a power-supply module 20 configured to receive energy from the motherboard 16 and power the components of the detection circuit 10. The power-supply module 20 may include wired means for transmitting the energy.

In an advantageous embodiment, represented in FIGS. 1 and 3, the communication module 18 includes radio-transmission means, for example radio-identification means, more often referred by the acronym "RFID" standing for "radio frequency identification". The radio-identification means may comprise a first induction loop 22 disposed on the detection circuit 10, electromagnetically coupled to a second induction loop 24 disposed on the motherboard 16. The power-supply module 20 may then be configured to receive by means of the first induction loop 22 the energy transmitted by the second induction loop 24 of the motherboard 16.

As illustrated in FIG. 2, each sensor 12 includes a voltage-controlled oscillator 40 coupled to a capacitive element 28. More particularly, the capacitive element 28 may be in the form of a block (or "pad") including a conductive central area 30 around which a conductive peripheral area 34 is disposed. An insulating area 32 separates the conductive central area 30 from the peripheral area 34. The peripheral area 34 is intended to be maintained at a neutral potential, namely typically 0 Volt. The conductive central area 30 as well as the peripheral area 34 may be formed by deposition of an electrical conductor over a surface of the detection circuit 10, for example by deposition of copper. Hence, each block forms an air or open-plate capacitor. The conductive central area 30 and the peripheral area 34 of the block are electrically coupled to the oscillator 40, so that a variation of the capacitance of the block produces a variation of the frequency of the signal $S_i$.

In one embodiment, each oscillator 40 is formed by an inverting logic gate with a Schmitt trigger input, thereby allowing producing a signal $S_i$ whose frequency presents a good stability, whose variation is typically lower than 0.05% Hz/° C. In the present application, each oscillator 40 presents an input capacitance whose value is substantially lower than or equal to 5 pF and a bandwidth substantially higher than 5 MHz. Depending on the cost of the electronic components and the available space, it is possible to choose the components of the oscillator 40 among the following non-exhaustive list: transistor(s) oscillators, operational Amplifier oscillators, Colpitts oscillators, Clapp oscillators, Hartley oscillators, Quartz oscillators, Wien bridge oscillators, logic gate oscillators. Typically, the components chosen for the oscillators 40 present the following characteristics: a high immunity to noise, a very low input capacitance, a high input resistance. Hence, the sensors 12 may be assembled using very low-cost components.

As represented in FIG. 2, the detection circuit 10 may be disposed opposite the tank 2 so that the longitudinal axis CD (represented in FIG. 2) of the block of each sensor 12 is substantially parallel to the axis NM of the tank 2. Alternatively, in other configurations not represented in the figures, the angle formed by the axes NM and CD may be non-zero. During the calibration phase described later, the effect on the measurements carried out by the sensors of a non-zero angle between the axes NM and CD on the sensors is then taken into consideration.

A space 1 between the surface of the sensors 12 and the wall of the tank 2 facing the sensors is arranged, so as to form an air gap. For an optimum operation, in the case of a tank whose walls are made of a thermoplastic material—for example, high-density polyethylene, polyethylene, polypropylene or polyoxymethylene—and whose thickness e is substantially smaller than or equal to 5 mm, the space 1 of the air gap should be substantially smaller than or equal to 3 mm.

Figure 4:
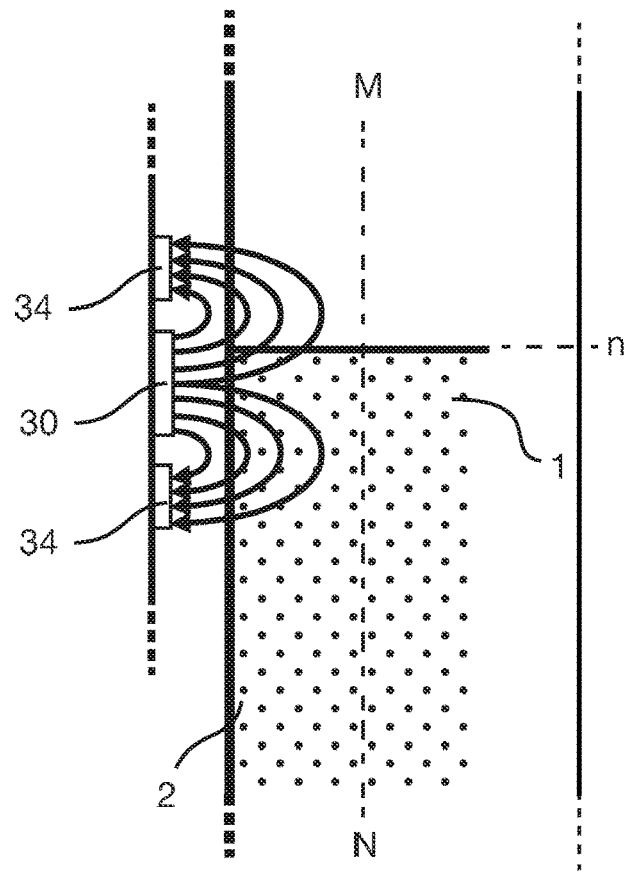
FIG. 4 is a schematic view illustrating the physical principle of measurement implemented by the measuring device according to the invention.

Referring in particular to FIG. 4, the physical principle of measurement implemented by the measuring device according to the invention will be now described. The measurement of the level n along the axis NM in the tank 2 is obtained by the measuring device by observing the frequency variations of the signals $S_i$ delivered by the sensors 12, said variations being a function of the level n. Indeed, the capacitance C of the capacitive element 28 of each sensor 12 is a function of the dielectric constants of the materials present between the surfaces of the conductive central area 30 and of the peripheral area 34 (the electric field lines are represented for one of the sensors 12 in FIG. 4). Hence, the capacitance C varies based on the dielectric constants of the air present between the capacitive element 28 and the wall of the tank 2, the material of the walls of the tank 2, and the possible presence of the fluid or of the gas/vacuum contained in the tank 2 for the measuring range $P_i$. The distance 1 between the sensor and the wall of the tank being constant as well as the thickness of the wall of the tank, only the level n of the fluid in the tank exerts a significant effect on the global dielectric constant as observed by the sensor 12. The capacitance C of the capacitive element 28 being thereby modified based on the fluid level n, the frequency of the corresponding signal $S_i$ derived from the $i^{th}$ sensor 12 also varies based on the level n. As example, if the frequency of the corresponding signal derived from the sensor 12 is higher than or equal to 1 MHz, the observed variation will be typically between 0 and 20 hertz. The level n of fluid 1 in the tank 2 is then determined by comparing the frequency of the signals $S_i$ at reference frequencies. The reference frequency may be proper to each sensor 12. For example, the reference frequency of the $i^{th}$ sensor 12 may be chosen equal to the frequency of the signal $S_i$ delivered by the oscillator of the $i^{th}$ sensor 12, when the level n of the fluid is lower than $h_{i-min}$. The reference frequencies may be determined during a calibration phase. The calibration phase may be carried out by the measuring device itself without any external intervention. The calibration phase may be carried out during the installation of the measuring device.

Referring to FIGS. 5, 6a, 6b, 6c and 7, the processing module 14 according to one embodiment of the invention as well as its operation will be now described. The processing module 14 comprises a microprocessor 50 coupled to an input 51 for receiving an electric power-supply. The processing module 14 is configured to implement the principle of the phase-locked loop coupled to a reference oscillator for determining the variations of the frequency of the signal $S_i$ of the sensors 12, produced by the variations of the fluid level n.

The processing module 14 includes a phase-locked loop 58, generally referred to by the acronym "PLL" standing for "Phase-Locked Loop", activated by the microprocessor 50. The microprocessor 50 is provided with a selector module 52. The selector module 52 allows coupling, successively, the output of the oscillator 40 of each of the different sensors 12 to the phase-locked loop 58. In the following description, the signal $S_i$, selected at a given instant t, by the selector module 52 is referred to as $S_{iPAD}$. The frequency of the signal $S_i$ selected at a given instant t, by the selector module 52 is referred to as $F_{iPAD}$.

The processing module 14 includes a voltage-controlled oscillator 54, acting as a reference oscillator, capable of producing a signal at a variable frequency, based on a control signal generated by a generator 56. The voltage-controlled oscillator 54 is coupled to the phase-locked loop 58. The generator 56 may be a pulse width modulated signal generator—more generally referred to by the acronym "PWM" standing for ("Pulse Width Modulation"), driven by the microprocessor 50. The generator 56 may be a digital-to-analog converter, driven by the microprocessor 50, to produce the control signal. The control signal is then converted into a voltage by a RC filter 59. The frequency $F_{iVCO}$ of the signal produced by the voltage-controlled oscillator 54 is predetermined for each of the sensors 12, during a calibration phase, in the absence of fluid 1 in the tank 2. Thus, the microprocessor 50 is configured to drive the generator 56 so that the voltage-controlled oscillator 54 delivers a signal whose frequency $F_{iVCO}$ corresponds to the frequency $F_{iCAL}$ predetermined during the calibration phase for the oscillator 40 currently selected by the selector module 52.

The phase-locked loop 58 is configured to generate an output signal $\Delta i$, based on the difference between the frequency $F_{iPAD}$ of the signal $S_{iPAD}$ currently selected by the selector module 52 and the frequency $F_{iVCO}$ of the signal produced by the voltage-controlled oscillator 54. Hence, the output signal $\Delta i$ is a function of the difference $F_{iVCO}-F_{iPAD}$. The two frequencies $F_{iVCO}$, $F_{iPAD}$ being sufficiently close to each other, the output signal $\Delta i$ corresponds to a phase-shift signal (a duty cycle, in the digital field), and may therefore be converted into a voltage $U_i$ by an output RC filter 60 coupled to the output of the phase-locked phase 58. Afterwards, the voltage $U_i$ is digitized by the microprocessor 50 using an analog-to-digital converter 62.

Using the selector module 52, the microprocessor 50 successively reads the value of the voltage $U_i$ for each sensor 12 of the detection circuit 10 and stores the corresponding values.

The microprocessor 50 also includes a conversion module 63 adapted to convert voltages $U_i$ collected for each sensor 12 into a level n of the fluid in the tank 2. An example of tables for converting the voltages $U_i$ into a level n is given in the diagrams of FIGS. 6c, 7 and 8. The level n may be transmitted on an output 64. Alternatively, the $n_c$ values of the levels $n_i$ as measured by each of the sensors 12 may be transmitted on the output 64.

Figure 9:
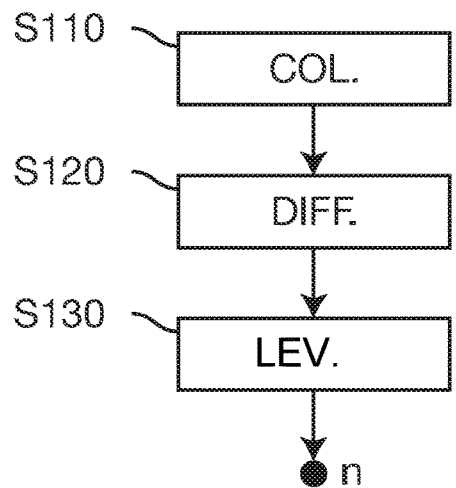
FIG. 9 is a synoptic diagram of the steps of a method for measuring a level of fluid in a storage system, according to one embodiment of the invention.

Referring now to FIG. 9 describing, by a synoptic diagram, the steps of a method for measuring a level n of fluid contained in a tank, along a vertical axis NM of said tank. The method is adapted in particular to be implemented by the previously-described measuring device. The method includes the following steps:

collecting S110 at least one signal $S_i$ delivered by a sensor, the sensor including a capacitive element electrically coupled to an oscillator configured to deliver a signal $S_i$ whose frequency $F_{iPAD}$ is a function of the capacitance of the capacitive element; said at least one sensor being intended to be disposed outside of the tank, so that the capacitance of the capacitive element varies based on the level n of the fluid, when said level is comprised between a first threshold $h_{i-min}$ and a second threshold $h_{i-max}$;

calculating S120 the difference between the frequency of the signal $S_i$ and a reference signal $F_{iVCO}$;

determining S130 the level n of fluid in the tank based on the frequency of the signal $S_i$.

Figure 8:
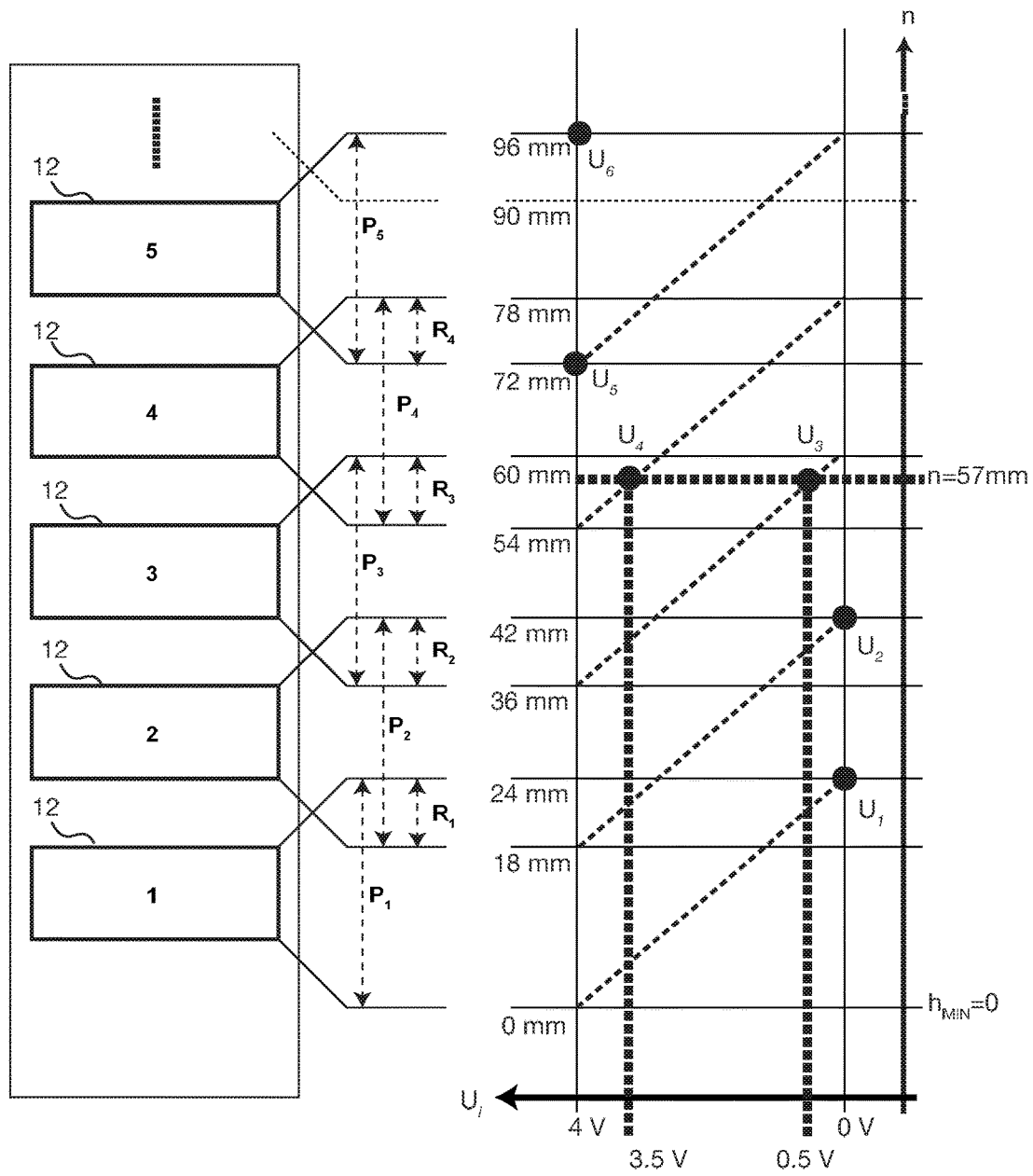
FIG. 8 is a diagram representing theoretical curves describing the voltage, delivered by the electrical measuring circuit, according to one embodiment in which the number of sensors is equal to 11, each sensor being adapted to measure the fluid level over a 24 mm wide range.

Referring in particular to FIG. 8, an example will be now described, in which the level n may vary between 0 and 20 cm in the tank 2, and the number $n_c$ of sensors 12 is equal to 11, each sensor being adapted to measure the level n over a 24 mm wide range. The range $P_1$ of the first sensor is equal to [0 mm . . . 24 mm], the range $P_2$ of the second sensor equal to [18 mm . . . 42 mm], the range $P_3$ of the third sensor equal to [36 mm . . . 60 mm], the range $P_4$ of the fourth sensor equal to [54 mm . . . 78 mm], the range $P_5$ of the fifth sensor equal to [72 mm . . . 96 mm], etc. The processing module will determine the voltage $U_i$ for each sensor. Thus, in the present example, the voltage $U_1$, will correspond to the voltage when the level n is higher than or equal to $h_{1-max}$, namely 0 V in the example of the conversion tables of FIG. 7. Similarly, the voltage $U_2$ will correspond to the voltage when the level n is higher than or equal to $h_{2-max}$, namely 0 V in the example of the conversion tables of FIG. 7. The voltage $U_i$ for i comprised between 5 and 11 corresponding to the $5^{th}$, $6^{th}$, $7^{th}$, $8^{th}$, $9^{th}$, $10^{th}$ and $11^{th}$ sensors will correspond to the voltage when the level n is lower than or equal to $h_{i-min}$, namely 4 V in the example of the conversion tables of FIG. 7. In the example of the conversion tables of FIG. 8, the voltage $U_3$ will be substantially equal to 0.5 V, and the voltage $U_4$ will be substantially equal to 3.5 V. Thus, knowing the measuring range of each of the sensors, the processing module 14 can determine the value of the level n.

In one embodiment, the processing module 14 includes at least one reference sensor 65, delivering a signal $S_{REF}$, adapted to enable the detection of variations of the environment which are likely to affect the sensors 12. The reference sensor 65 may include for example the same elements as the other sensors 12, but will be disposed on the detection circuit 10 so that the variations of the level n do not affect its capacitive element. The microprocessor is then coupled to the reference sensor 65 so as to receive the signal $S_{REF}$ and is configured to correct the signals $S_i$ based on the variations of the frequency of the signal $S_{REF}$, by acting on each $F_{iVCO}$ of each sensor 12.

In one embodiment, the processing module 14 includes at least one temperature sensor 66 adapted to deliver a voltage $U_{TEMP}$ based on the temperature of the environment of the sensors 12. The microprocessor 50 is then coupled to the temperature sensor 66 so as to receive the signal $U_{TEMP}$ and is configured to correct the signals $S_i$ based on the temperatures observed by the temperature sensor 66.

Figure 5:
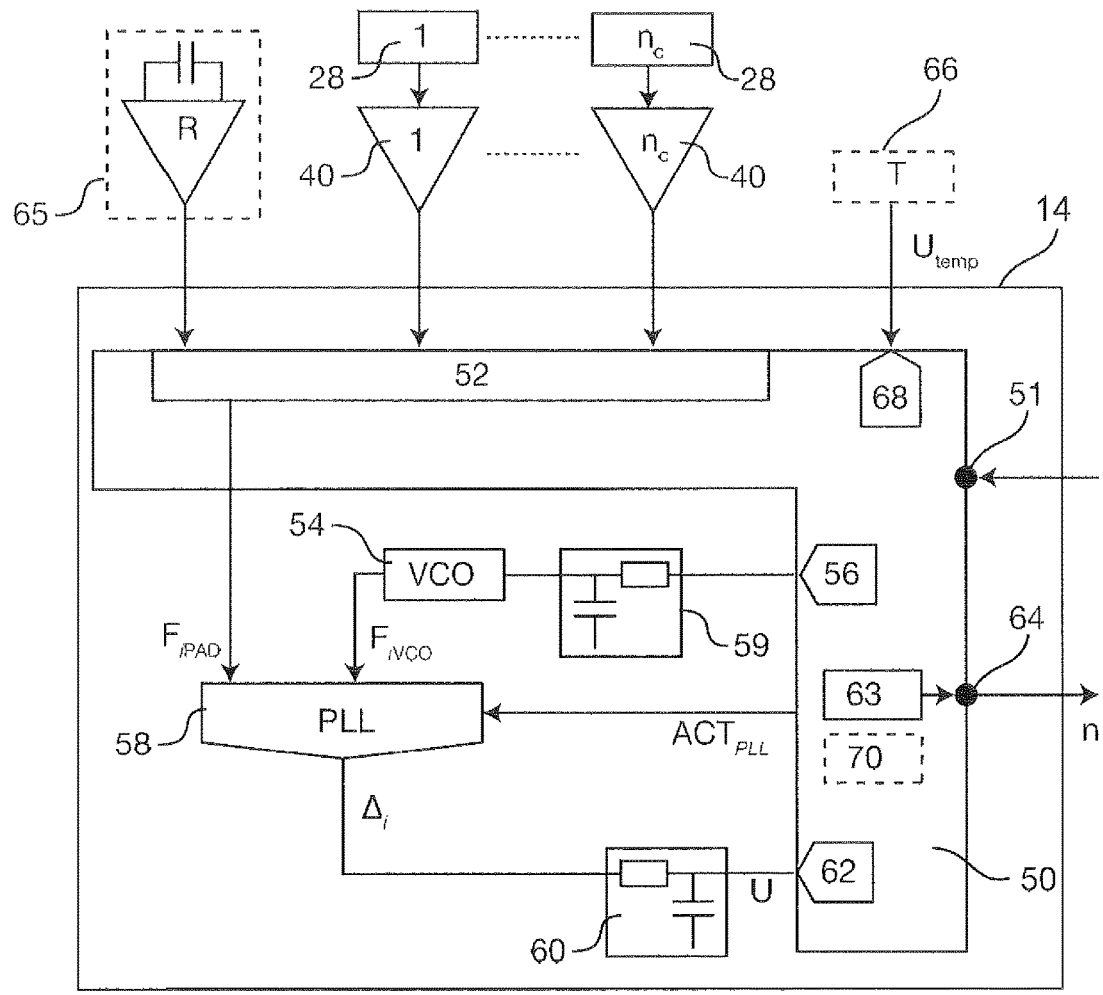
FIG. 5 is a block diagram of an electrical measuring circuit of the measuring device according to one embodiment of the invention.

In one embodiment, the processing module 14 includes a diagnosis module 70. As illustrated in FIG. 5, the diagnosis module 70 may be comprised within the microprocessor 50. The diagnosis module 70 is configured to check the proper operation of the sensors 12 and/or of the components of the measuring device. The diagnosis module 70 is coupled to the analog-to-digital converter 62 so as to have access to the voltages $U_i$ for each sensor 12. Furthermore, the diagnosis module 70 has access to the tables for converting the voltages $U_i$ into a level n, used by the conversion module 63. Hence, the diagnosis module 70 can determine in particular the theoretical values of the voltages that each sensor 12 should deliver based on the level n.

Figure 12:
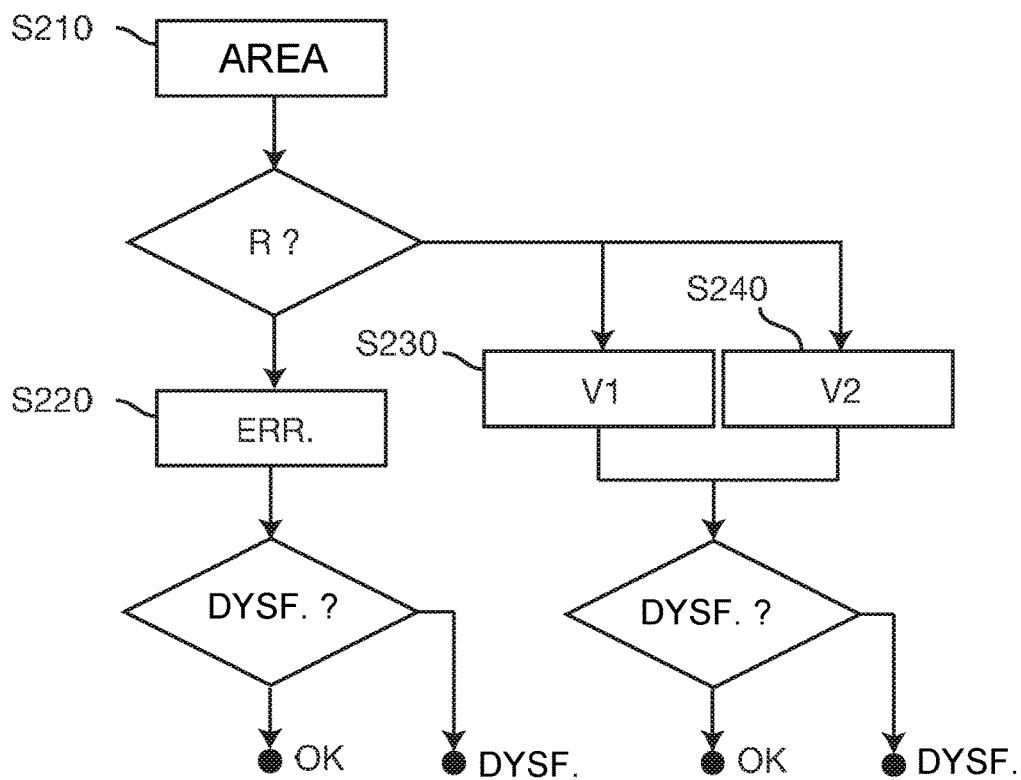
FIG. 12 is a synoptic diagram of the steps of a diagnosis method according to the invention for verifying the coherence of the signals delivered by the sensors.

Referring in particular to FIG. 12, the steps of a diagnosis method according to the invention for checking the coherence of the signals $S_i$ delivered by the sensors 12 will be now described. In particular, the diagnosis method may be implemented by the diagnosis module 70. Advantageously, the diagnosis method may be implemented to diagnose possible problems or errors which are likely to affect the validity or the accuracy of the value of the level n obtained upon completion of step S130 of the measuring method according to the invention.

The steps described hereinafter apply when the fluid 1 is in a liquid state in the tank 2: thus, the method may include an optional step (not represented in FIG. 12) during which the state of the fluid is determined. For example, the state may be obtained by determining physical parameters, such as the temperature and the pressure, relative to the fluid and/or to the environment thereof, and by verifying if the value of the physical parameters is comprised in a range in which it is known that all the fluid in the tank is in the liquid state. If the fluid is not in the liquid state or only in part, then the method is stopped or alternatively a message is emitted indicating that the result of the coherence test should not be taken into account.

During a first step S210, it is determined whether the level n, obtained upon completion of step S130, is comprised in one of the overlapping ranges $R_i$ of two adjacent sensors 12.

Figure 10:
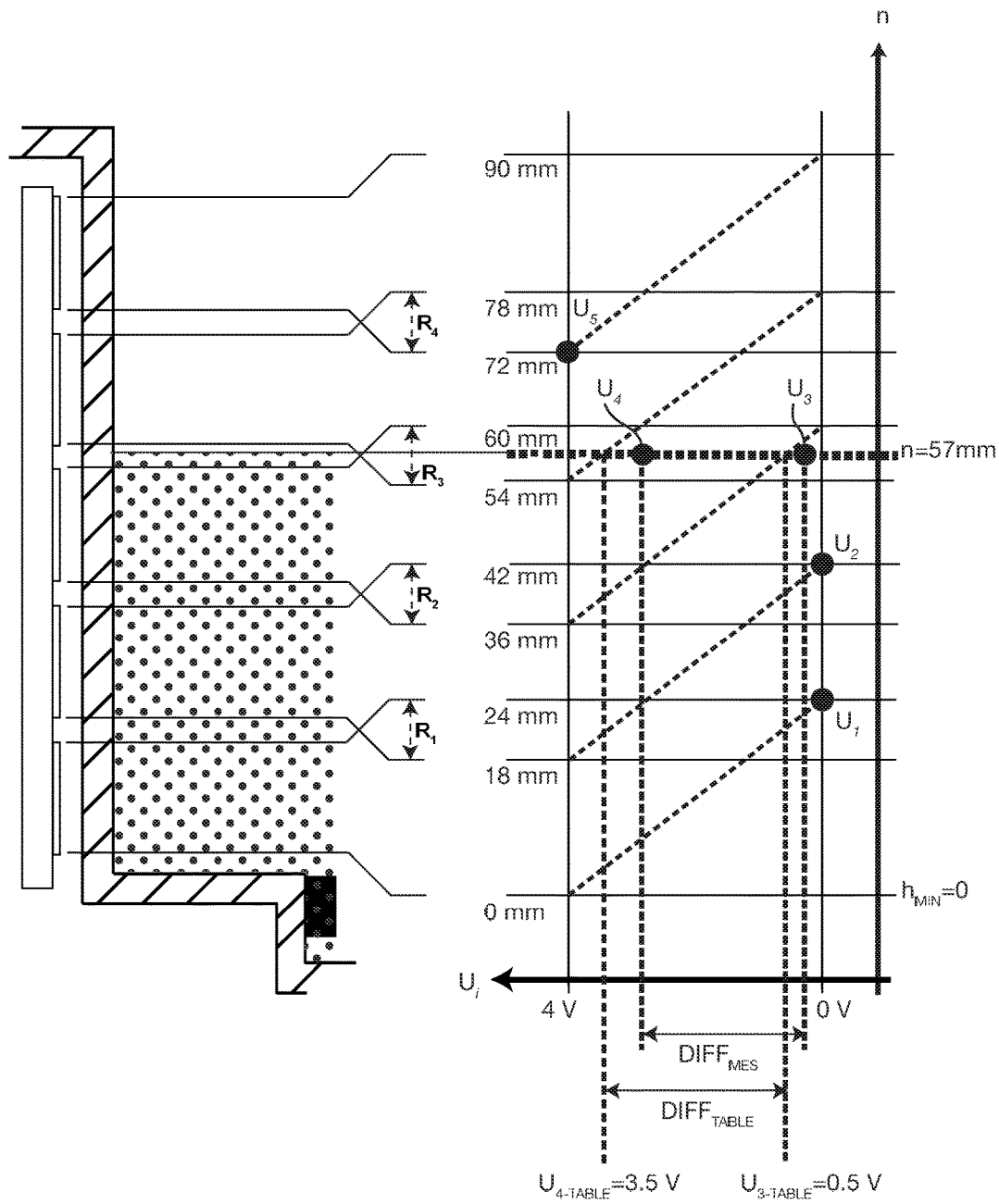
FIG. 10 is a diagram representing theoretical curves describing the voltage, delivered by the electrical measuring circuit when the latter takes into account the frequency observed for each sensor, as well as examples of voltage values measured by the sensors, as a function of the level of fluid in the storage system, when the latter is comprised in one of the overlapping ranges of two adjacent sensors.

If the level n is comprised in one of the overlapping ranges $R_i$, an error determination step S220 is implemented. Such case is illustrated by FIG. 10. In this example, the level n is equal to 57 mm. Hence, the level n is comprised both in the range $P_3$ of the third sensor 12 and in the range $P_4$ of the fourth sensor 12. Hence, the level n is in the overlapping range $R_3$. During step S220, there is determined the difference $DIFF_{TABLE}$ in absolute value between the expected value $U_{3-TABLE}$ for the level n of the voltage $U_3$ for the $3^{rd}$ sensor and the expected value $U_{4-TABLE}$ for the level n of the voltage $U_4$ for the $4^{th}$ sensor:

$$DIFF_{TABLE}=|U_{3-TABLE}-U_{4-TABLE}|$$

The expected value $U_{3-TABLE}$ and the expected value $U_{4-TABLE}$ may be determined by reading, for the level n, the value corresponding to each sensor in the same conversion tables used by the conversion module 63 to determine the level n. Thus, the difference $DIFF_{TABLE}$ corresponds to the expected deviation, for the level n, according to the conversion tables, between the voltages $U_3$ and $U_4$. In the example of FIG. 10, the difference $DIFF_{TABLE}$ is equal to the absolute value of the difference between the voltage $U_3$ and the voltage $U_4$, obtained by reading the conversion tables for the level n=57 mm, namely |0.5−3.5|=3V.

During step S220, there is determined the difference $DIFF_{MES}$ in absolute value between, on the one hand, the value of the voltage $U_3$ measured for the $3^{rd}$ sensor and, on the other hand, the value of the voltage $U_4$ measured for the $4^{th}$ sensor:

$$DIFF_{MES}=|U_3-U_4|$$

Thus, the difference $DIFF_{MES}$ corresponds to the deviation actually measured by the measuring device, between the voltages $U_3$ and $U_4$.

During step S220, a permissible deviation $\delta$ is determined or obtained. For example, the permissible deviation $\delta$ may be chosen and/or configured to be substantially equal to the measurement accuracy, whether theoretical or measured during a calibration step, for each sensor 12. During step S220, there is then determined whether the absolute value of the difference between, on the one hand, the difference $DIFF_{MES}$ and, on the other hand, the difference $DIFF_{TABLE}$, is lower than twice the permissible deviation, namely:

$$|DIFF_{MES}-DIFF_{TABLE}|<2.\delta$$

If so, the measured level n is considered to be valid. If not, the measured level n is considered to be potentially unreliable, so that an alert may then be transmitted to the external module, for example the motherboard 16, to indicate a potential dysfunction of the measuring device.

Figure 11:
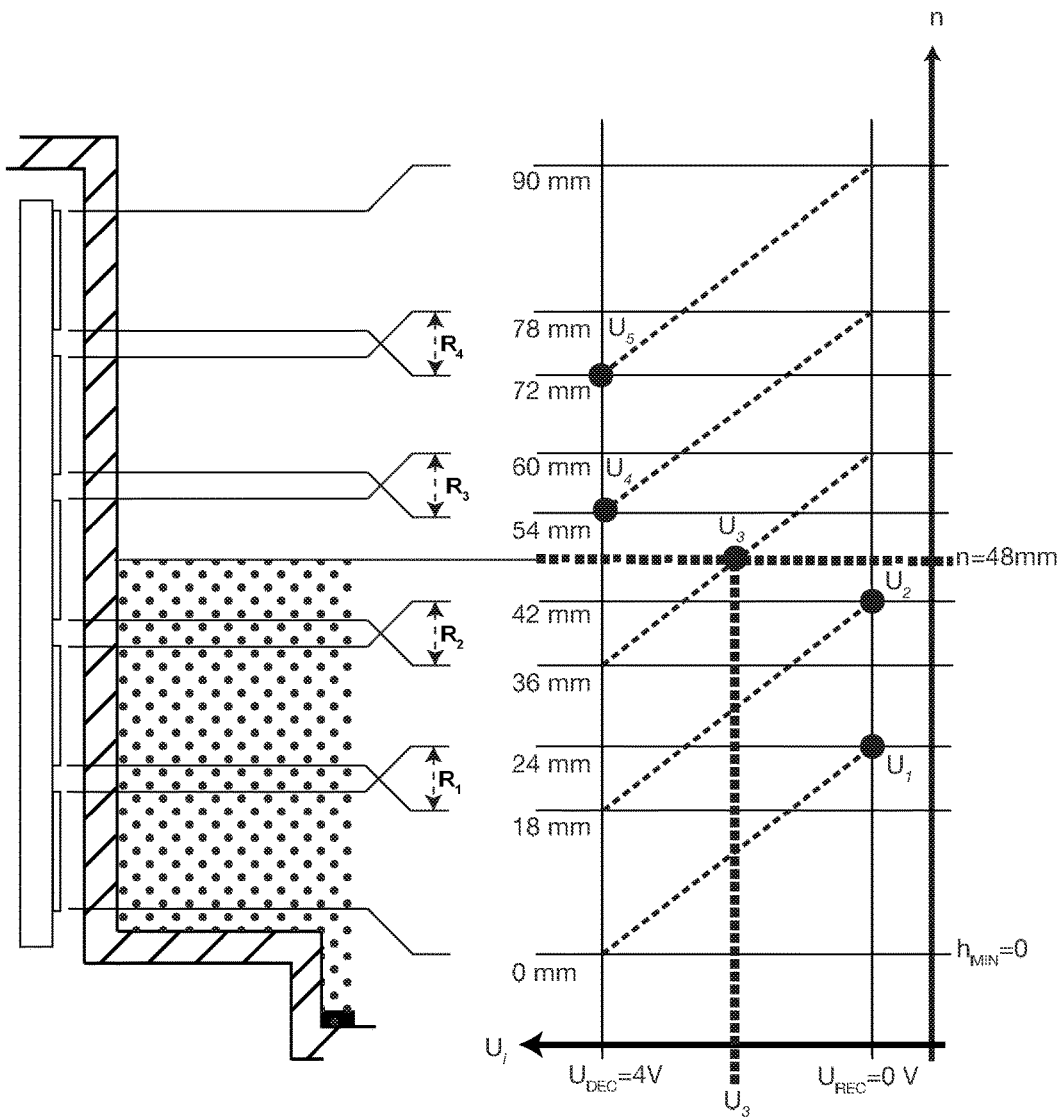
FIG. 11 is a diagram representing theoretical curves describing the voltage, delivered by the electrical measuring circuit when the latter takes into account the frequency observed for each sensor, as well as examples of voltage values measured by the sensors, as a function of the level of fluid in the storage system, when the latter is located outside of the overlapping ranges of the adjacent sensors.

If, during the first step S210, it has been determined that, the level n, obtained upon completion of step S130, is located outside of the overlapping ranges $R_i$ of two adjacent sensors 12, an upstream error determination step S230 and a downstream error determination step S240 are implemented. Such a case is illustrated by FIG. 11. In this example, the level n is equal to 48 mm, and is therefore comprised only in the range $P_3$ of the $3^{rd}$ sensor 12.

During the upstream error determination step S230, there is determined an expected voltage $U_{DEC}$ corresponding to the voltage $U_i$ expected when the level n is lower than the lower bound $h_{i\text{-}min}$ of the corresponding range $P_i$. The expected voltage $U_{DEC}$ may be determined by reading, when the level n is lower than the lower bound $h_{i\text{-}min}$ of the range $P_i$, the corresponding value in the same conversion tables used by the conversion module 63 to determine the level n. The voltage $U_{DEC}$ may also be determined during a calibration step, in the absence of fluid 1 in the tank 2. In the example of FIG. 11, the voltage $U_{DEC}$ is equal to 4 V.

During step S230, for each sensor whose lower bound $h_{i\text{-}min}$ of the measuring range $P_i$ is higher than the level n, the voltage $U_i$ measured for each of said sensors is compared to the expected voltage $U_{DEC}$. Thus, in the example of FIG. 11, it is checked, during step S230, whether the voltage $U_4$ measured for the $4^{th}$ sensor and the voltage $U_5$ measured for the $5^{th}$ sensor are substantially equal to the expected voltage $U_{DEC}$.

If so, the signals $S_i$ of each sensor whose lower bound $h_{i\text{-}min}$ of the range $P_i$ is higher than the level n, are considered to be valid. If not, the signals $S_i$ of the sensors whose lower bound $h_{i\text{-}min}$ of the range $P_i$ is higher than the level n, and for which the difference between the voltage $U_i$ and the expected voltage $U_{DEC}$ is substantially non-zero, are considered to be potentially unreliable, and an alert may then be transmitted to the external module, for example the motherboard 16, to indicate a potential dysfunction of the corresponding sensors.

During the downstream error determination step S240, there is determined the expected voltage $U_{REC}$ corresponding to the voltage $U_i$ when the level n is higher than the upper bound $h_{i\text{-}max}$ of the corresponding range $P_i$. The expected voltage $U_{REC}$ may be determined by reading, when the level n is higher than the upper bound $h_{i\text{-}max}$ of the corresponding range $P_i$, the corresponding value in the same conversion tables used by the conversion module 63 to determine the level n. The voltage $U_{REC}$ may also be determined during a calibration step, the tank being completely filled with fluid 1. In the example of FIG. 11, the voltage $U_{REC}$ is equal to 0 V. During step S240, for each sensor whose upper bound $h_{i\text{-}max}$ of the measuring range $P_i$ is lower than the level n, the voltage $U_i$ measured for each of said sensors is compared to the expected voltage $U_{REC}$. Thus, in the example of FIG. 11, it is checked, during step S240, whether the voltage $U_i$ measured for the $1^{st}$ sensor and the voltage $U_2$ measured for the $2^{nd}$ sensor are substantially equal to the expected voltage $U_{REC}$.

If so, the signals $S_i$ of each sensor whose upper bound $h_{i\text{-}max}$ of the measuring range $P_i$ is lower than the level n, are considered to be valid. If not, the signals $S_i$ of the sensors whose upper bound $h_{i\text{-}max}$ of the measuring range $P_i$ is lower than the level n, and for which the difference between the voltage $U_i$ and the expected voltage $U_{REC}$ is substantially non-zero, are considered to be potentially unreliable, and an alert may then be transmitted to the external module, for example the motherboard 16, to indicate a potential dysfunction of the corresponding sensors.

If, during steps S230 and S240, the signals $S_i$ of each sensor whose upper bound $h_{i\text{-}max}$ of the measuring range $P_i$ is lower than the level n, and the signals $S_i$ of each sensor whose lower bound $h_{i\text{-}min}$ of the range $P_i$ is higher than the level n, are considered to be valid, then the level n determined by the measuring device is considered to be valid. This information may be transmitted to the external module, for example the motherboard 16. Otherwise, the level n determined by the measuring device is considered to be potentially unreliable, and an alert may then be transmitted to the external module, for example the motherboard 16, to indicate a potential dysfunction of the measuring device.

The invention claimed is:

1. A measuring device configured to cooperate with a tank containing a fluid, said measuring device being adapted to determine a level (n) of the fluid, along a vertical axis (NM) of said tank, wherein the measuring device includes:
    at least one sensor including a capacitive element electrically coupled to an oscillator configured to deliver a signal ($S_i$) whose frequency ($F_{iPAD}$) is a function of the capacitance of the capacitive element; said at least one sensor being disposed outside the tank, so that the capacitance of the capacitive element varies based on the level (n) of the fluid when said level is comprised between a first threshold ($h_{i\text{-}min}$) and a second threshold ($h_{i\text{-}max}$); the sensor being configured to be contactless with the tank and the fluid;
    a processing module, coupled to said at least one sensor, and configured to determine the level (n) of fluid in the tank based on the frequency of the signal ($S_i$); and
    a diagnosis module configured:
        (i) when the fluid level (n) determined by the processing module is lower than the first threshold ($h_{i\text{-}min}$), to identify a dysfunction if a difference between the frequency ($F_{iPAD}$) of the signal ($S_i$) and a first reference frequency is substantially non-zero;
        (ii) when the fluid level (n) determined by the processing module is higher than the second threshold ($h_{i\text{-}max}$), to identify a dysfunction if a difference between the frequency ($F_{iPAD}$) of the signal ($S_i$) and a second reference is substantially non-zero.

2. The device according to claim 1, wherein the processing module is configured to determine the level (n) of fluid in the tank based on the frequency of the signal ($S_i$) and on a reference frequency ($F_{iVCO}$) proper to said at least one sensor.

3. The device according to claim 2, wherein the processing module is configured to determine the reference frequency ($F_{iVCO}$), in an initial calibration phase, and/or periodically, and/or upon the occurrence of an event, and/or upon receipt of a command.

4. The device according to claim 2, wherein the reference frequency ($F_{iVCO}$) is equal to the frequency of the signal ($S_i$) delivered by the oscillator of said at least one sensor when the level of the fluid is lower than the first threshold ($h_{i\text{-}min}$).

5. The device according to claim 2, wherein the processing module includes:
    a voltage-controlled reference oscillator configured to produce a signal whose frequency ($F_{iVCO}$) varies based on a control signal;
    a microprocessor configured to generate and deliver to the reference oscillator the control signal so that the frequency ($F_{iVCO}$) of the signal produced by the reference oscillator corresponds substantially to the reference frequency proper to said at least one sensor;
    a phase-locked loop configured to generate an output signal ($\Delta i$) based on a difference between the frequency ($F_{iPAD}$) of the signal ($S_i$) delivered by said at least one sensor and the reference frequency ($F_{iVCO}$);

an output filter, coupled to the output of the phase-locked loop, adapted to convert the phase-shift signal (Δi) into an output voltage ($U_i$);

a conversion module configured to determine the level (n) based on the output voltage ($U_i$).

6. the device according to claim 1, wherein the processing module is coupled to an external module:
by a communication module, capable of enabling a transmission of the level (n) of the fluid in the tank to the external module; and/or.
by a power-supply module, capable of enabling a transmission of energy from the external module to said at least one sensor.

7. The device according to claim 1, further including a diagnosis module configured:
when the fluid level (n) determined by the conversion module is lower than the first threshold ($h_{i\text{-}min}$), to identify a dysfunction if a difference between the output voltage ($U_i$) and a first reference voltage ($U_{DEC}$) is substantially non-zero;
when the fluid level (n) determined by the conversion module is higher than the second threshold ($h_{i\text{-}max}$), to identify a dysfunction if a difference between the output voltage ($U_i$) and a second reference voltage ($U_{REC}$) is substantially non-zero.

8. The device according to claim 1, further including at least one second sensor including a second capacitive element electrically coupled to a second oscillator configured to deliver a second signal ($S_i$) whose frequency ($F_{iPAD}$) is a function of the capacitance of the second capacitive element; said at least one second sensor being disposed outside the tank, so that the capacitance of the second capacitive element varies based on the level (n) of the fluid, when said level is comprised between a third threshold ($h_{i\text{-}min}$) and a fourth threshold ($h_{i\text{-}max}$); the processing module being coupled to said at least one second sensor, and being configured to determine the level (n) of fluid in the tank based on the frequency of the signal ($S_i$) of said at least one sensor and on the frequency of the signal ($S_i$) of said at least one second sensor.

9. The device according to claim 8, wherein the range of values defined by the third threshold ($h_{i\text{-}min}$) and the second threshold ($h_{i\text{-}max}$).

10. The device according to claim 8, wherein the third threshold is lower than the second threshold, and further including a diagnosis module configured, when the fluid level (n) determined by the conversion module is comprised between the third threshold and the second threshold, to:
identify a dysfunction if an absolute value of a difference between the fluid level (n) determined by the processing module from the signal ($S_i$) of said at least one second sensor and the fluid level (n) determined by the processing module from the signal ($S_i$) of said at least one sensor, is higher than a permissible deviation.

11. A kit including a measuring device according to claim 1, and a tank assembled so that a space is arranged between the surface of the capacitive element of said at least one sensor and the wall of the tank.

12. The kit according to claim 11, further including an aqueous urea solution contained in the tank.

13. A kit including a measuring device according to claim 1, and an external module configured to receive the level (n) of the fluid in the tank and/or to enable a transmission of energy to said at least one sensor.

14. A method for measuring a level (n) of fluid contained in a tank, along a vertical axis (NM) of said tank, wherein the method comprises the following steps of:
collecting at least one signal ($S_i$) delivered by a sensor, the sensor including a capacitive element electrically coupled to an oscillator configured to deliver a signal ($S_i$) whose frequency ($F_{iPAD}$) is a function of the capacitance of the capacitive element; said at least one sensor being disposed outside the tank, so that the capacitance of the capacitive element varies based on the level (n) of the fluid, when said level is comprised between a first threshold ($h_{i\text{-}min}$) and a second threshold ($h_{i\text{-}max}$);
calculating a difference between the frequency of the signal ($S_i$) and a reference frequency ($F_{iVCO}$);
determining the level (n) of fluid in the tank based on the frequency of the signal ($S_i$);
when the determined fluid level (n) is lower than the first threshold ($h_{i\text{-}min}$), identifying a dysfunction if a difference between the frequency ($F_{iPAD}$) of the signal ($S_i$) and a first reference frequency is substantially non-zero;
when the determined fluid level (n) is higher than the second threshold ($h_{i\text{-}max}$), identifying a dysfunction if a difference between the frequency ($F_{iPAD}$) of the signal ($S_i$) and a second reference frequency is substantially non-zero.

15. The method according to claim 14, wherein at least one second signal ($S_i$) delivered by a second sensor is collected, the second sensor including a capacitive element electrically coupled to an oscillator configured to deliver a second signal ($S_i$) whose frequency ($F_{iPAD}$) is a function of the capacitance of the capacitive element; said at least one second sensor being configured to be disposed outside of the tank, so that the capacitance of the capacitive element varies based on the level (n) of the fluid, when said level is comprised between a third threshold ($h_{i\text{-}min}$) and a fourth threshold ($h_{i\text{-}max}$); the third threshold being lower than the second threshold; the level (n) of fluid in the tank being determined based on the frequency of the signal ($S_i$) of said at least one sensor and on the frequency of the signal ($S_i$) of said at least one second sensor; and wherein, when the fluid level (n) determined during the fluid level (n) determination step is comprised between the third threshold and the second threshold, further including the following step of:
identifying a dysfunction if an absolute value of a difference between, on the one hand, the fluid level (n) determined from the signal ($S_i$) of said at least one second sensor and, on the other hand, the fluid level (n) determined from the signal ($S_i$) of said at least one sensor, is higher than a permissible deviation.

* * * * *